United States Patent
Hill et al.

(10) Patent No.: US 9,166,882 B1
(45) Date of Patent: Oct. 20, 2015

(54) REMOTE BROWSING SESSION MANAGEMENT

(75) Inventors: Peter F. Hill, Seattle, WA (US); Jonathan A. Jenkins, Seattle, WA (US); Adam J. Overton, Redmond, WA (US); Matthew L. Trahan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 655 days.

(21) Appl. No.: 13/324,741

(22) Filed: Dec. 13, 2011

(51) Int. Cl.
*H04L 29/06* (2006.01)
*H04L 12/24* (2006.01)
*H04L 27/08* (2006.01)
*H04L 29/08* (2006.01)

(52) U.S. Cl.
CPC ............ *H04L 41/0823* (2013.01); *H04L 67/04* (2013.01); *H04L 65/601* (2013.01)

(58) Field of Classification Search
CPC ..... H04L 65/605; H04L 67/02; H04L 67/303; H04L 29/06027; H04L 67/28; H04L 65/4007; H04L 65/4084; H04L 65/602; H04L 65/607; H04L 67/30; H04L 12/2898; H04L 12/583; H04L 67/306; H04L 12/5835; H04L 29/06489
USPC ........................................................ 709/246
See application file for complete search history.

(56) References Cited

U.S. PATENT DOCUMENTS

| 2006/0184639 | A1* | 8/2006 | Chua et al. ................... 709/217 |
| 2007/0154190 | A1* | 7/2007 | Gilley et al. .................. 386/125 |
| 2009/0254529 | A1* | 10/2009 | Goldentouch .................... 707/3 |
| 2012/0021835 | A1* | 1/2012 | Keller et al. ..................... 463/42 |
| 2012/0030305 | A1* | 2/2012 | Marquess et al. ............. 709/213 |
| 2012/0047449 | A1* | 2/2012 | Burckart et al. .............. 715/753 |
| 2012/0066586 | A1* | 3/2012 | Shemesh ....................... 715/235 |
| 2012/0265802 | A1* | 10/2012 | Shen et al. .................... 709/203 |
| 2012/0271948 | A1* | 10/2012 | Martin .......................... 709/226 |

\* cited by examiner

*Primary Examiner* — Anthony Mejia
*Assistant Examiner* — Joseph M Cousins
(74) *Attorney, Agent, or Firm* — Knobbe, Martens, Olson & Bear, LLP

(57) ABSTRACT

A browsing process is directed to the generation and management of a browse session at a network computing provider. A client computing device requests a remote browse session instance at a network computing provider. The browse session instance may correspond to requested network content. The network computing provider determines one or more browse configurations. Different browse configurations can be determined for separate portions of the requested network content. The browse configurations may identify a communication protocol and various processing actions. The network computing provider retrieves the requested content through an instantiated network browse session instance, and performs a first set of processing actions to generate a processing result. The processing result may be provided to the client computing device for display, including performing a second set of processing actions on the processing result at the client computing device.

32 Claims, 17 Drawing Sheets

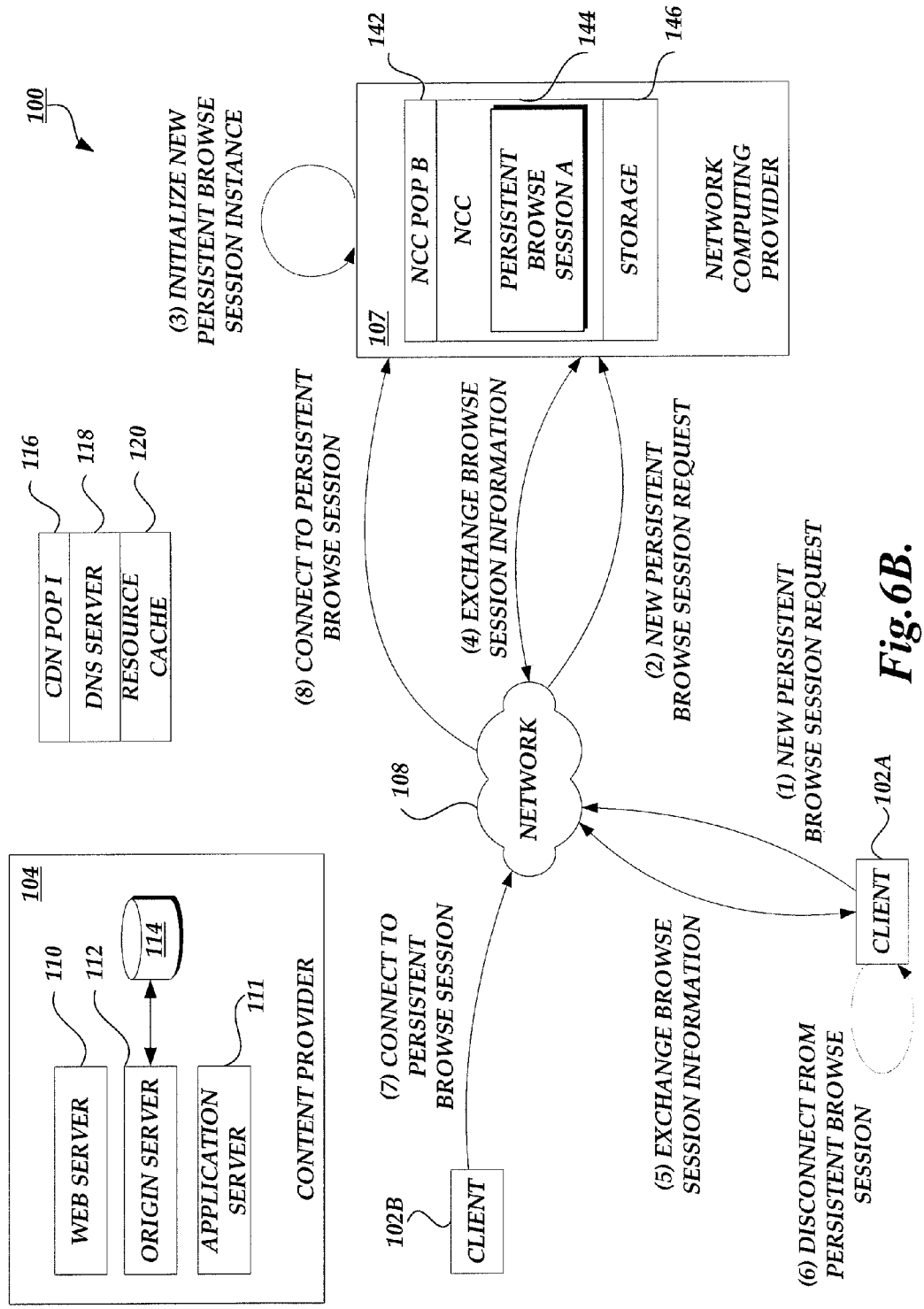

REMOTE BROWSING SESSION MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content provider s will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

From the perspective of a user utilizing a client computing device, a user experience can be defined in terms of the performance and latencies associated with obtaining network content over a communication network, such as obtaining a Web page, processing embedded resource identifiers, generating requests to obtain embedded resources, and rendering content on the client computing device. Latencies and performance limitations of any of the above processes may diminish the user experience. Additionally, latencies and inefficiencies may be especially apparent on computing devices with limited resources, such as processing power, memory or network connectivity such as netbooks, tablets, smartphones, and the like.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6B is a block diagram of the content delivery environment of FIG. 1 illustrating the generation and processing of a persistent browse session initialized by one client computing device and resumed by a different client computing device;

DETAILED DESCRIPTION

Figure 1:
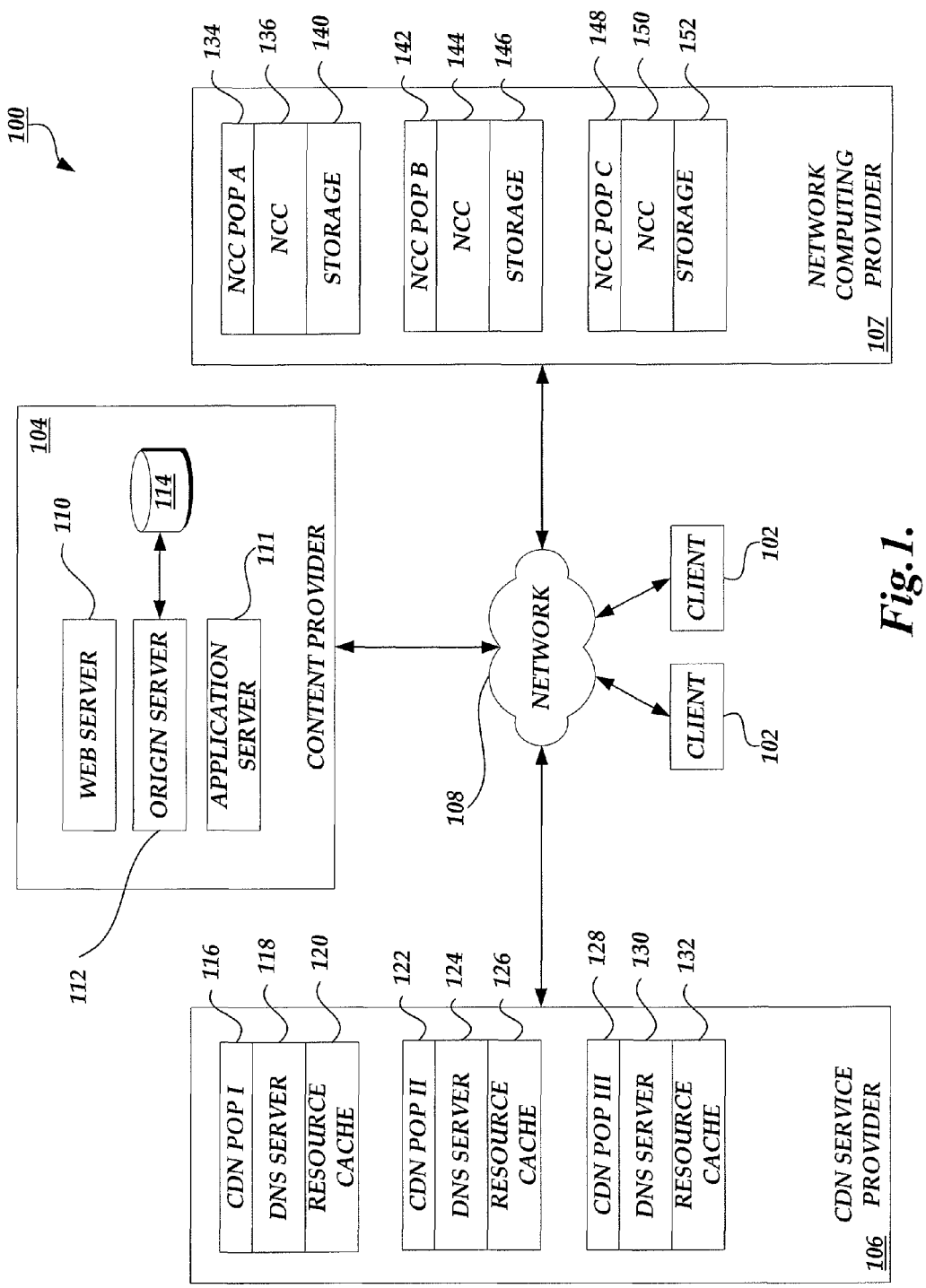
FIG. 1 is a block diagram illustrative of a content delivery environment including a number of client computing devices, content provider, a content delivery network service provider, and a network computing provider.

Generally described, the present disclosure is directed to the generation and management of a remote application session between client computing devices and content provider s in conjunction with a network computing provider. Specifically, aspects of the disclosure will be described with regard to the request for a browse session by a client computing device with a content provider, the establishment of a remote browse session between one or more client computing devices and a network computing provider, the determination of one or more browsing configurations for processing the request, and the transmission of browse session state data and client interaction data between the client computing device and the network computing provider. Although aspects of the embodiments described in the disclosure will focus, for the purpose of illustration, on the management of a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content provider s. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider by establishing a browse session with a network computing provider across a private or public network. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the client computing device to transmit a request for a new browse session to the network computing provider, including the selected URL. The address or location of a network computing provider capable to service the browse session request may be hardcoded into the browser, may be configurable by the user, may be obtained from a network address service, or may be determined in any other way.

In an illustrative embodiment, responsive to the browse session request received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network. Illustratively, in some situations, one or more devices associated with the network computing provider may be located in a data center or other robustly networked computing environment, and, as compared to the client computing device, may experience relatively little latency or delay when obtaining network resources.

Using the instantiated network computing components, the network computing provider may request the identified network resource(s) from one or more content provider s, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources, or content may include any file type or format known in the art and supported by the specific software application.

Having obtained the requested content (e.g., the requested network resource and embedded resources), the network computing provider may identify one or more browsing configurations for the requested content, based on the processing requirements for one or more portions of the requested content. The browsing configurations can specify a remote session communication protocol for use in transmitting the requested content, user interaction data, intermediate processing results, and other information between the browser being executed on the client computing device and the browser being executed at the instantiated network computing component on the network computing provider. The information exchanged between the browser on the instantiated network computing component and the browser on the client computing device can be generally referred to as "browser session information."

In addition to specifying a remote session communication protocol for transmitting information between the client computing device and the instantiated network computing component, in one embodiment, the identified remote session browsing configurations may specify that one or more processing actions to be performed on the requested content are to be performed at the network computing provider rather than, or in addition to, at the client computing device For purposes of illustration, the processing of network content by a browser may involve various processing actions before content can be rendered in an appropriate form on a client computing device. A Web page, for example, may be parsed and processed to process various HTML layout information and references to associated resources or embedded content such as CSS style sheets and Javascript, as well as embedded content objects such as images, video, audio, etc. Each object or piece of code may be parsed and processed before a representative object model corresponding to the web page may be constructed and processed further for layout and display. In accordance with the selected remote session browsing configurations, the client computing device and the instantiated network computing component may exchange processing results via browser session information (e.g., state data or display data representing the requested content).

The remote session may be a co-browse session, involving one or more additional client computing devices, each of which can see, interact with, and update the requested content, and the updates can be seen by the other client computing devices in the co-browse session. Additionally, the browse session, whether or not it is a co-browse session, may be a persistent browse session. Client computing devices can disconnect from, and re-establish a connection to the persistent browse session without requiring the network resource to be retrieved from the content provider again.

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service provider s (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service provider s. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service provider s via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content provider s and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content provider s that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference now to FIGS. 2, 3, 4, 5, 6A, 6B, and 6C ("FIGS. 2-6"), the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing provider 107. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
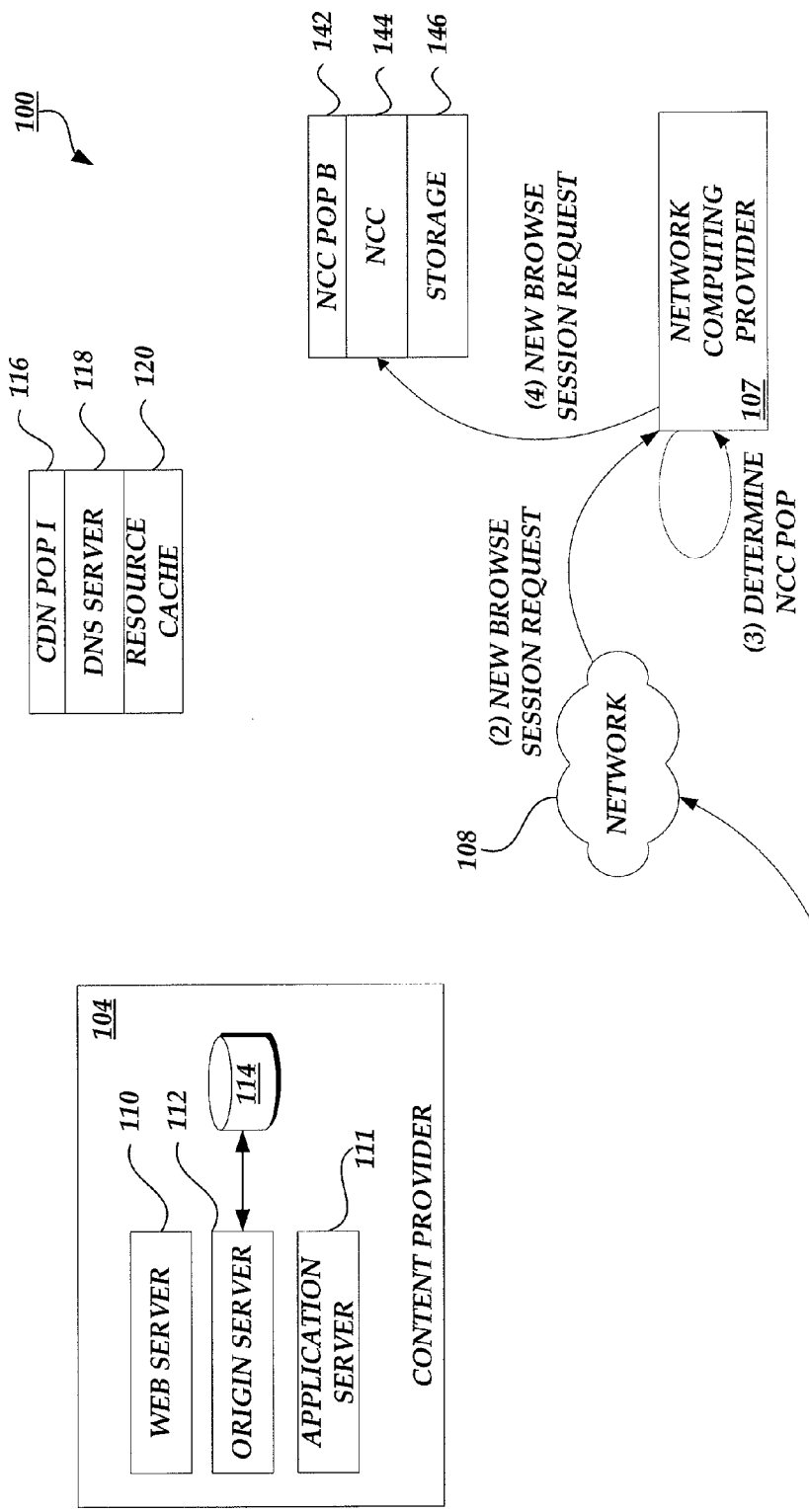
FIG. 2 is a block diagram of the content delivery environment of FIG. 1 illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content provider s 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content provider s 104 and client computing devices 102.

Figure 3:
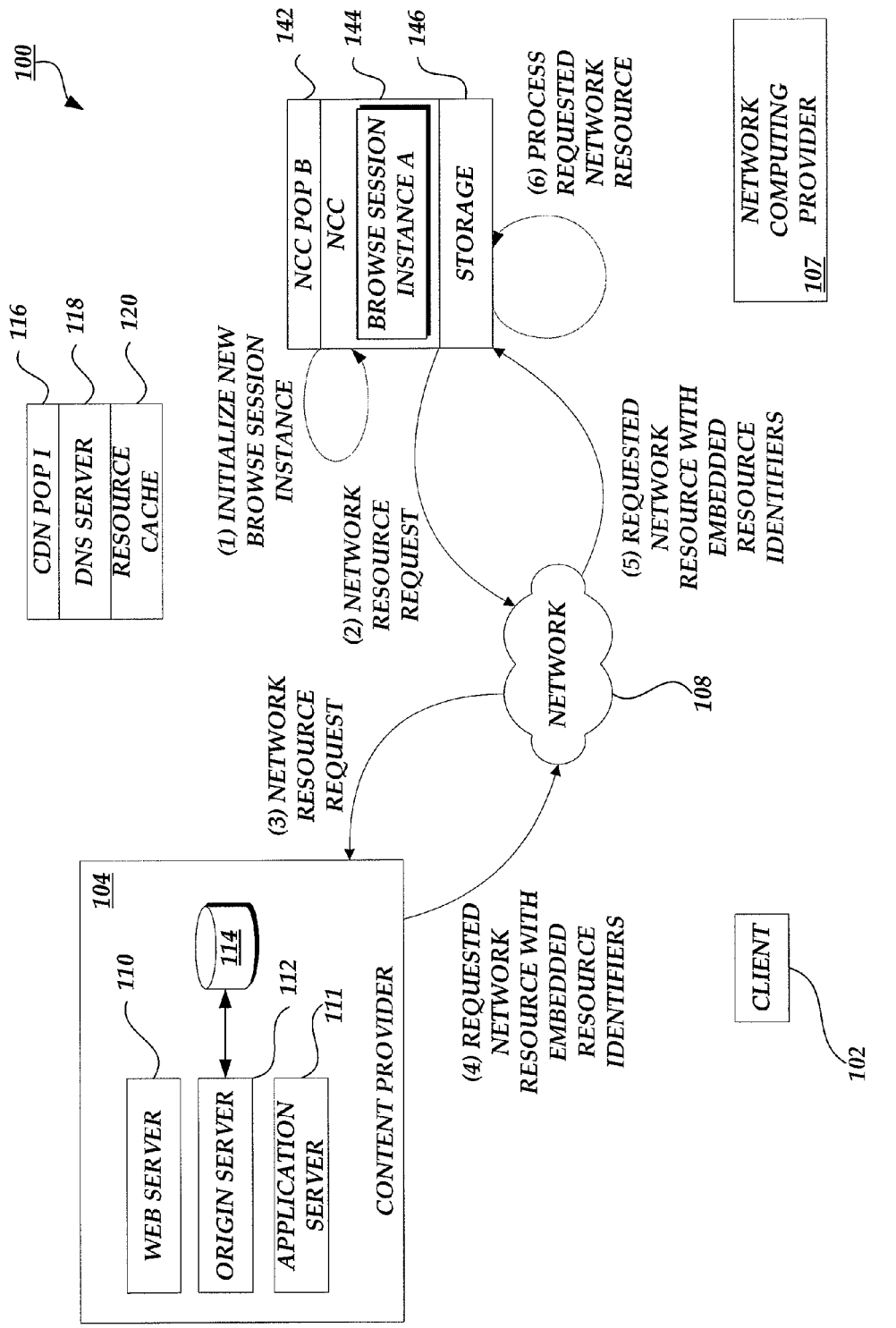
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content provider s based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content provider s, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4.

Figure 4:
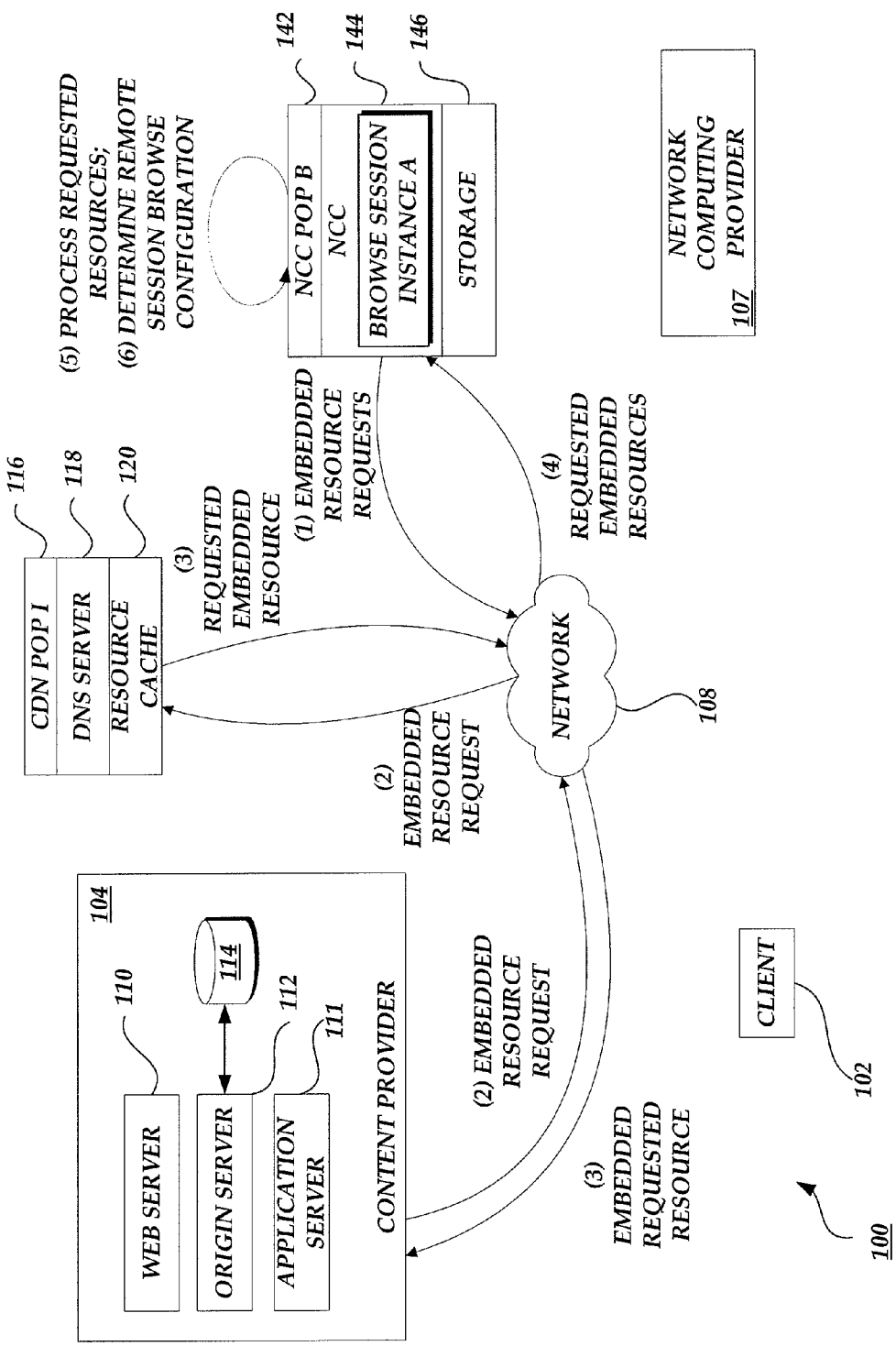
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content provider s, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
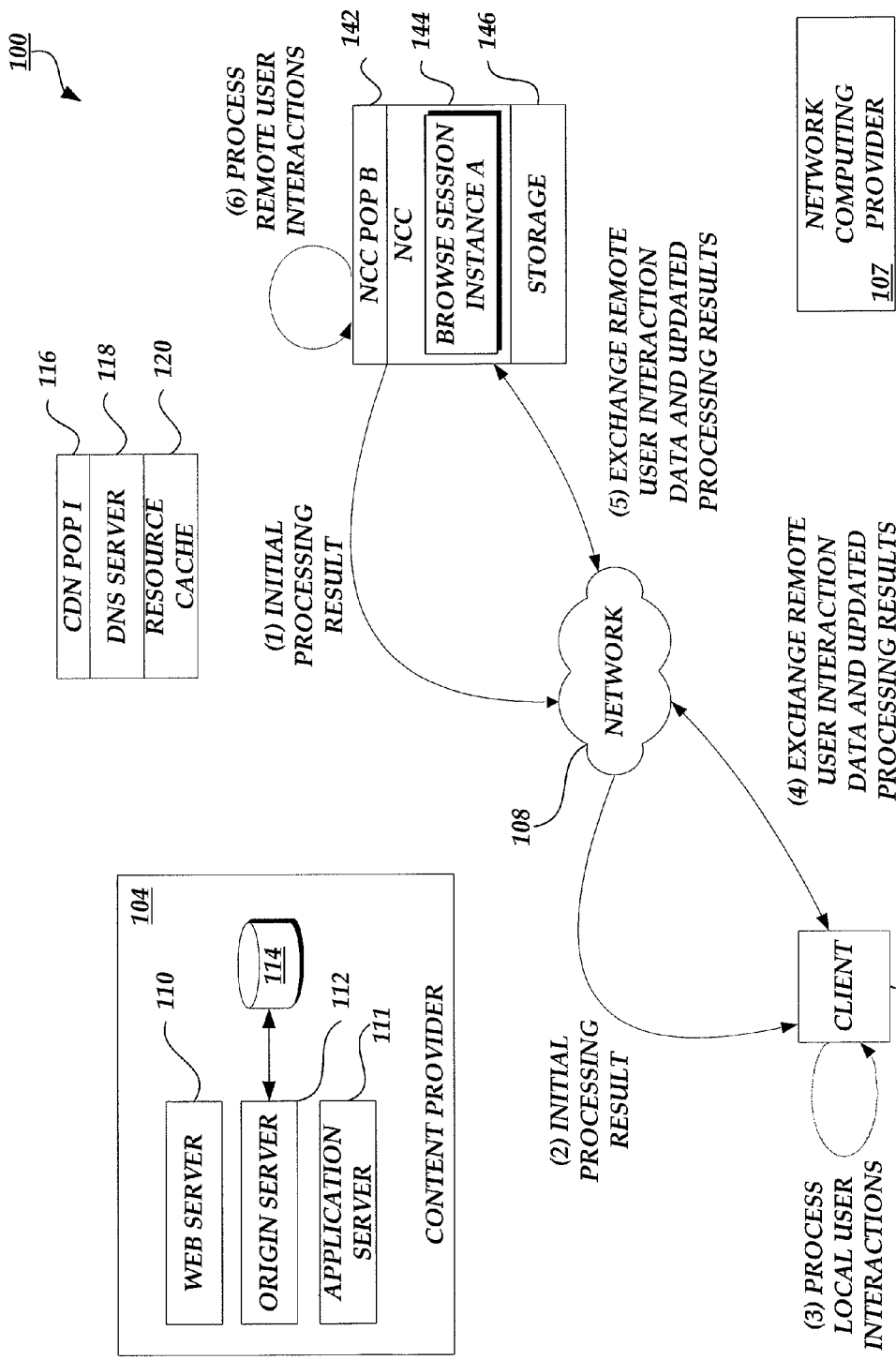
FIG. 5 is a block diagram of the content delivery environment of FIG. 1 illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device in response to changes to the content or remote user interaction data from the client computing device.

Figure 6A:
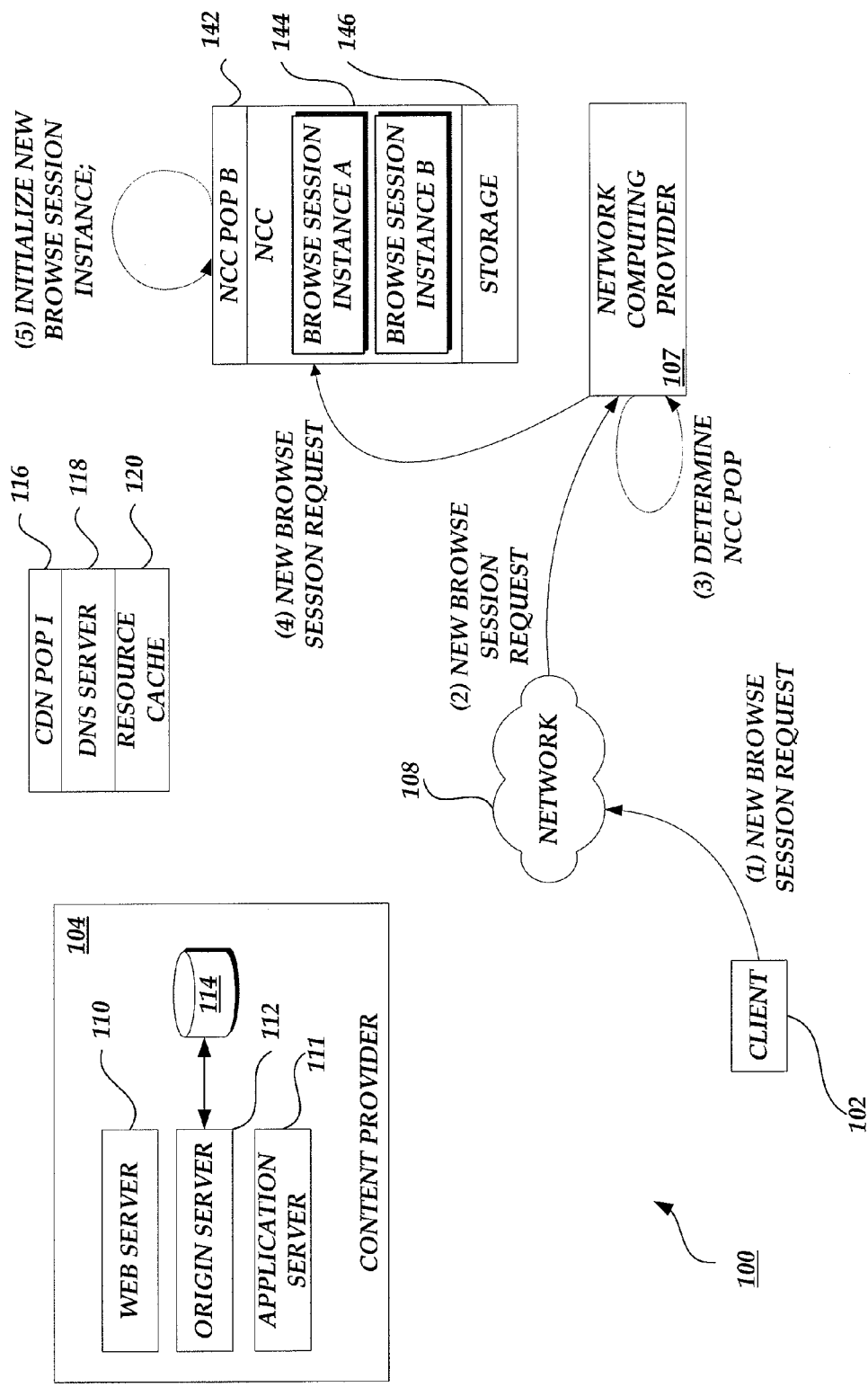
FIG. 6A is a block diagram of the content delivery environment of FIG. 1 illustrating the generation and processing of an additional new browse session request from a client computing device to a network computing provider.

With reference to FIG. 6A, a block diagram of the content delivery environment of FIG. 1 illustrating the generation and processing of an additional new browse session request from a client computing device to a network computing provider is disclosed. As illustrated in FIG. 6A, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

Subsequent to the receipt of the browse session request, the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

With reference to FIG. 6B, a block diagram of the content delivery environment of FIG. 1 illustrating the generation and processing of a persistent browse session request from a client computing device to a network computing provider is disclosed. As illustrated in FIG. 6B, a second client computing device 102B can connect to the persistent browse session after the first client computing device 102A has requested it and disconnected from it. In some embodiments, a second client computing device 102B can connect to the persistent browse session while the first client computing device 102A is still connected. In an illustrative embodiment, the network computing provider 107 utilizes a registration API to accept persistent browse session requests from the client computing devices 102A and 102B.

Figure 6C:
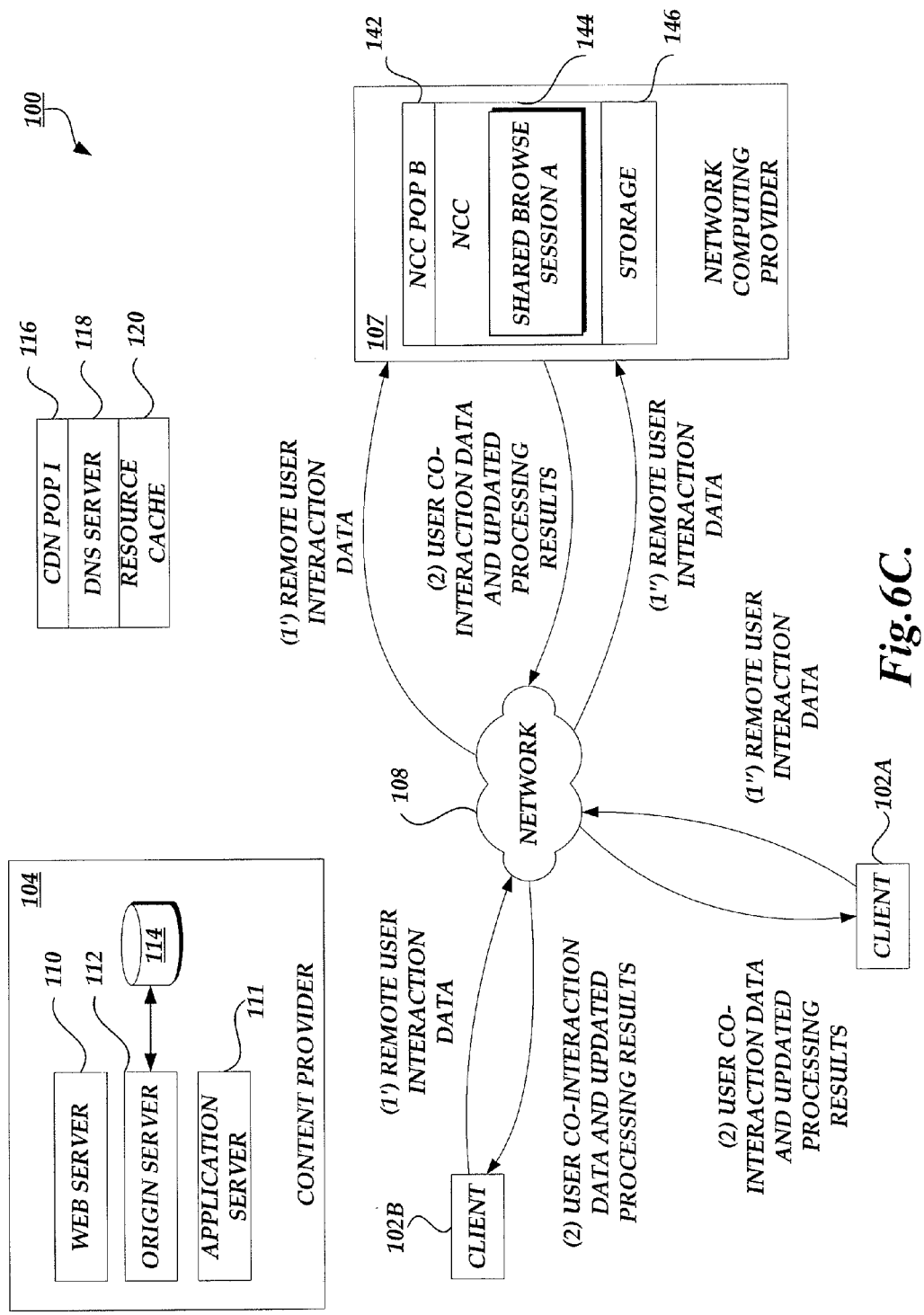
FIG. 6C is a block diagram of the content delivery environment of FIG. 1 illustrating the generation and processing of a co-browsing session between multiple client computing devices and a network computing provider.

With reference to FIG. 6C, a block diagram of the content delivery environment of FIG. 1 illustrating the generation and processing of a co-browse session request from a client computing device to a network computing provider is disclosed. As illustrated in FIG. 6C, a second client computing device 102B may connect to the co-browse session initialized by the first client computing device 102A. When two or more client computing devices 102A, 102B are connected to a co-browse session, user interaction data from each device can be transmitted to the network computing provider 107. In response, the network computing provider 107 can generate and transmit updated processing results to the client computing devices 102A, 102B. The updated processing results can reflect the user interactions on the multiple client computing devices 102A, 102B.

Figure 7A:
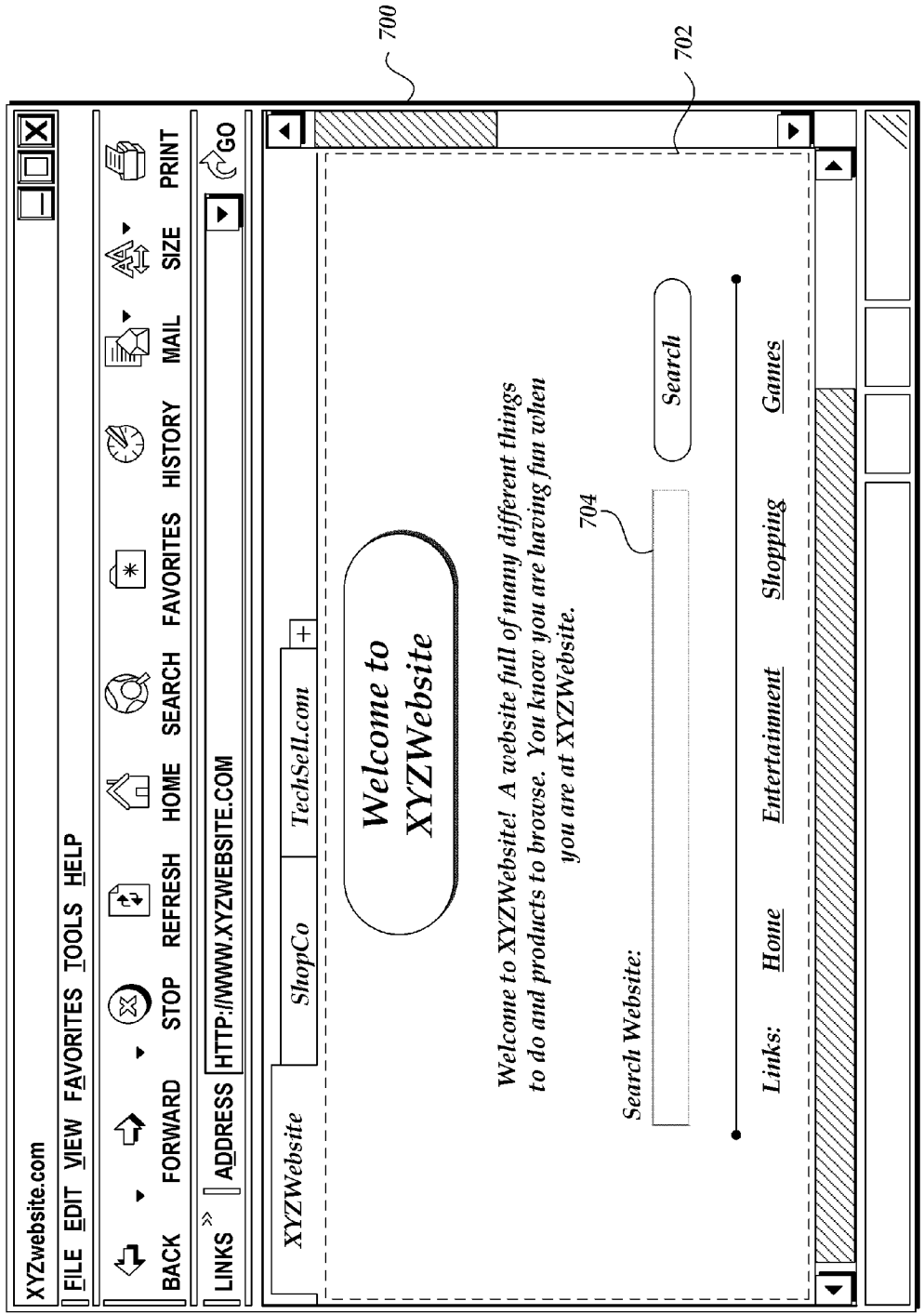
FIG. 7A is a user interface diagram depicting an illustrative browser interface and display of browse session content.

FIG. 7A is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area or may be overlaid or embedded in the content display area. The content display area 702 may have two or more distinct portions, such as frames or divs, which can be processed according to different browsing configurations as described herein. The portions may also be determined dynamically, with images, videos, applets, animations, input controls, etc. being assigned different browsing configurations. For example, the input control 704 illustrated in FIG. 7A as a text input box can be assigned a browsing configuration which moves associated Javascript or other executable validation and processing to the network computing provider 104, while the rest of the content display area 702 is processed entirely on the client computing device 102.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Figure 7B:
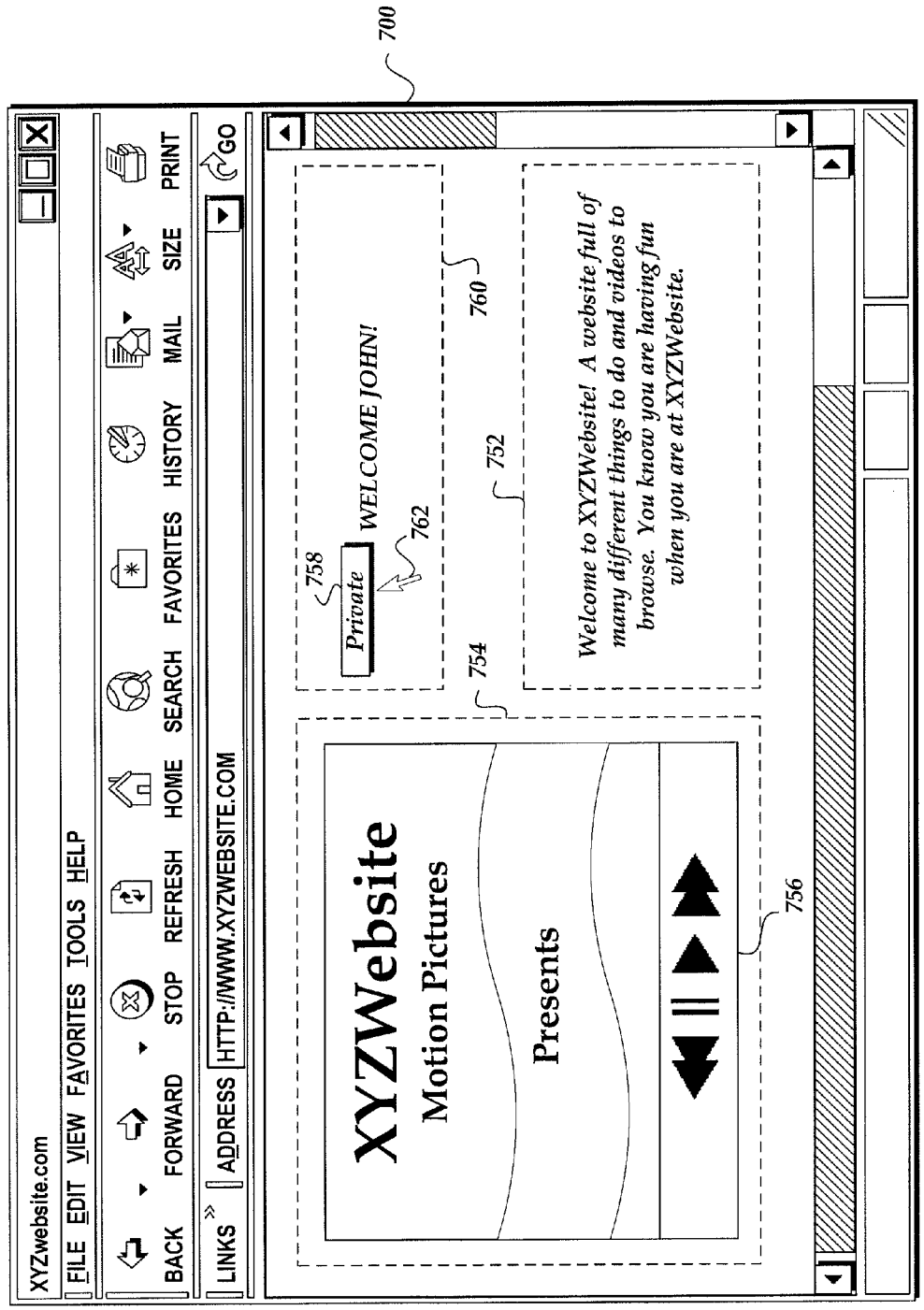
FIG. 7B is a user interface diagram depicting an illustrative browser interface and display of a network resource with two portions processed according to two browsing configurations.

FIG. 7B illustrates a browser application displaying a network resource with two portions of content. The two portions of content can be processed according to different browsing configurations, as described in detail herein. For example, the text and image based portion 752 can be primarily processed on the client computing device 102. The video portion 754 may be processed primarily at the network computing provider 104. For example, the video can be rendered at the network computing provider 104 utilizing one of any number of codecs. The rendered content can be accessed by the client computing device 102 via an RDP connection or a connection utilizing any other remote computing protocol. In this example, the client computing device 102 does not require the codec to render the video. Such a browsing configuration may assign processing of user interface interactions to the client computing device 102 for improved visual feedback and responsiveness. For example, the playback control panel 756 can be processed by the client computing device 102 even thought the video is rendered by the network computing provider 104.

In some embodiments, an indicia 758 can be provided, indicating where processing has taken place or of which client computing devices 102 in a co-browsing session have access to the portion. For example, in a co-browsing session, some areas of the display, such as personalized area 760, can be updated by, and displayed to, only one client computing device 102, while the remainder can be shared among some or all of the client computing devices of the co-browsing session. The indicia 758 can be a panel of text displayed over a portion when a mouse cursor 762 is moved over it. In some embodiments, the indicia can be an outline, background image, background color, and the like.

Figure 8:
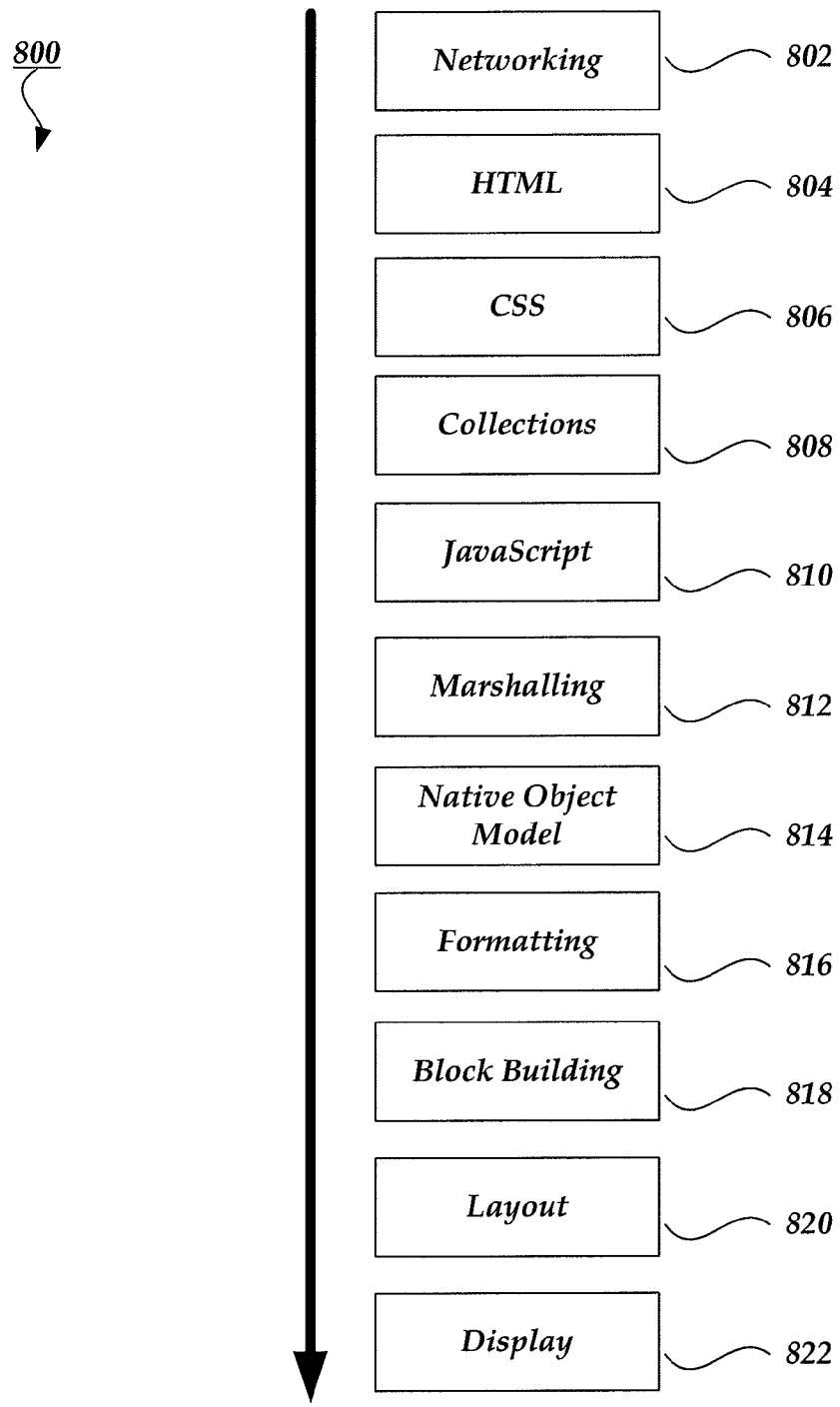
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem

814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
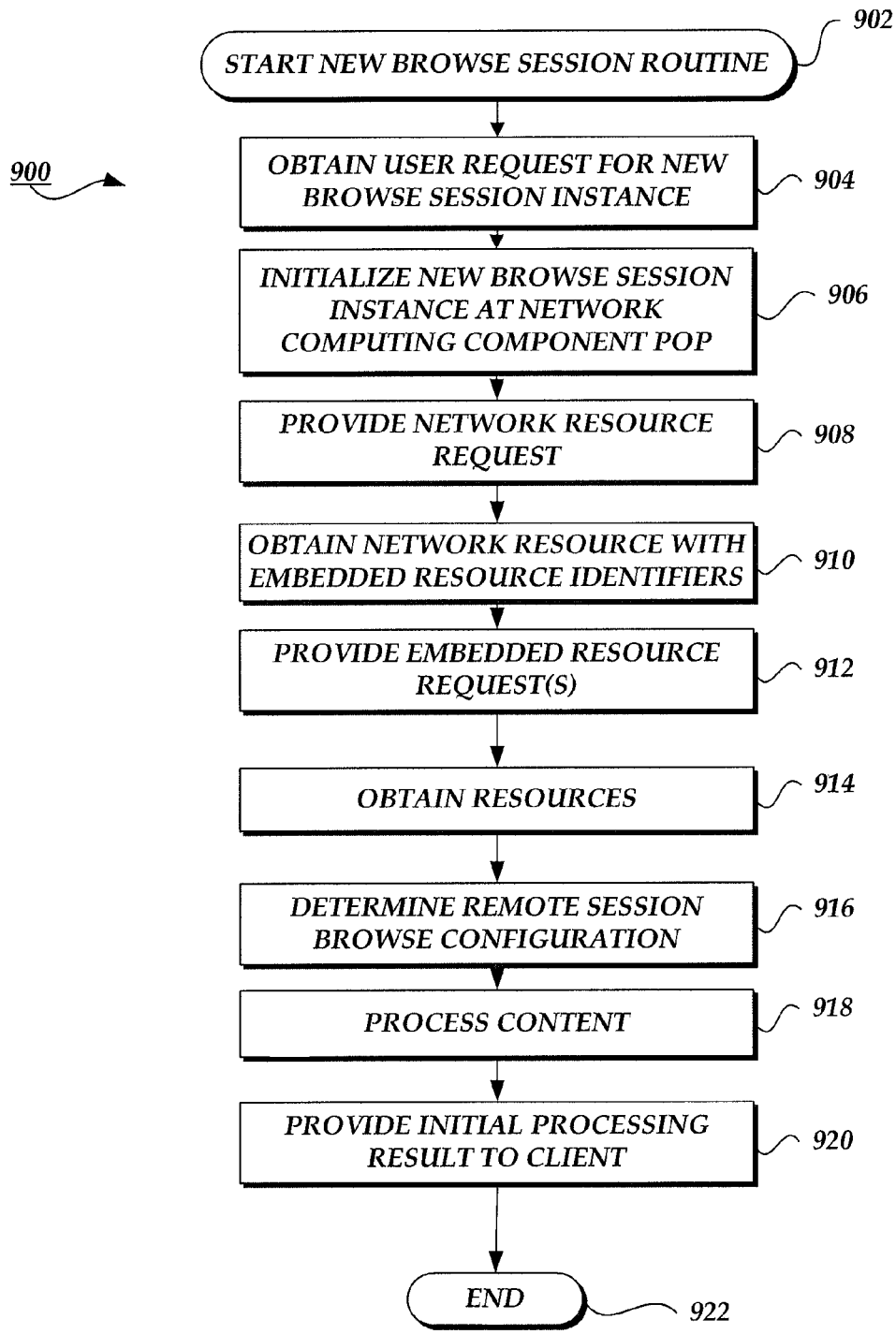
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content provider s, CDN service provider s, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing provider (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content provider s, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5 and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing provider 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
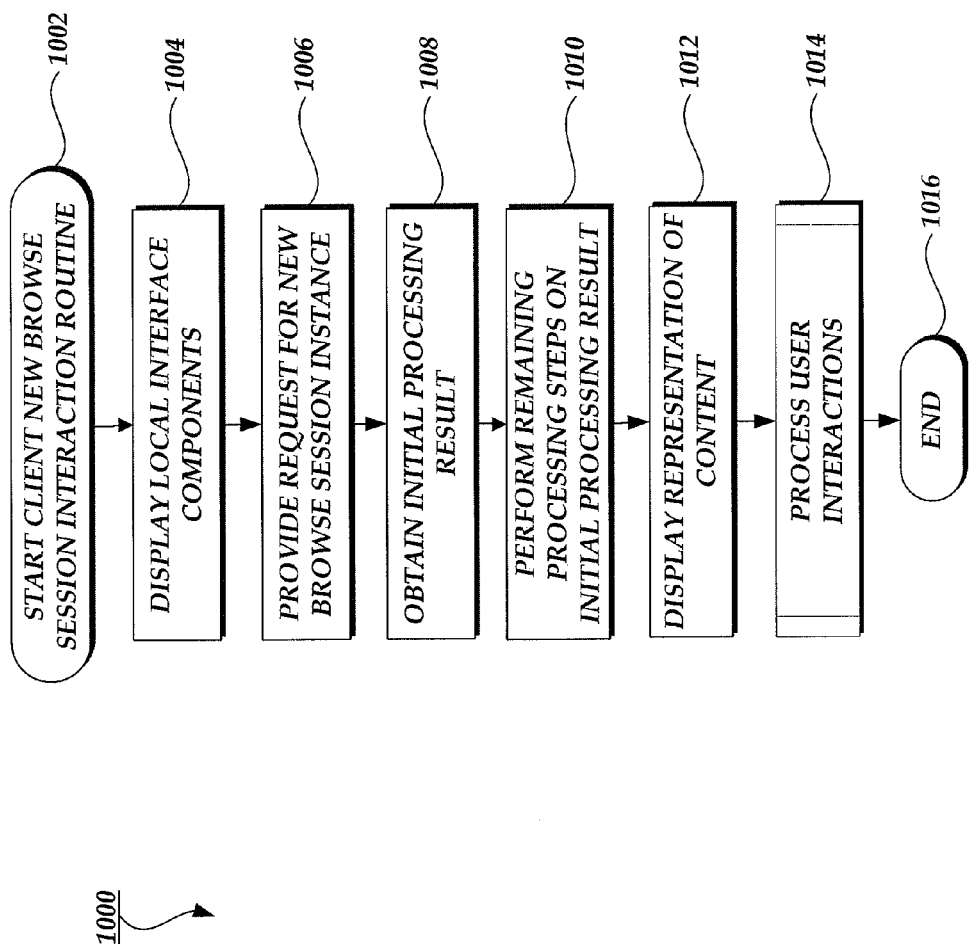
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5 and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content provider s 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7A above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
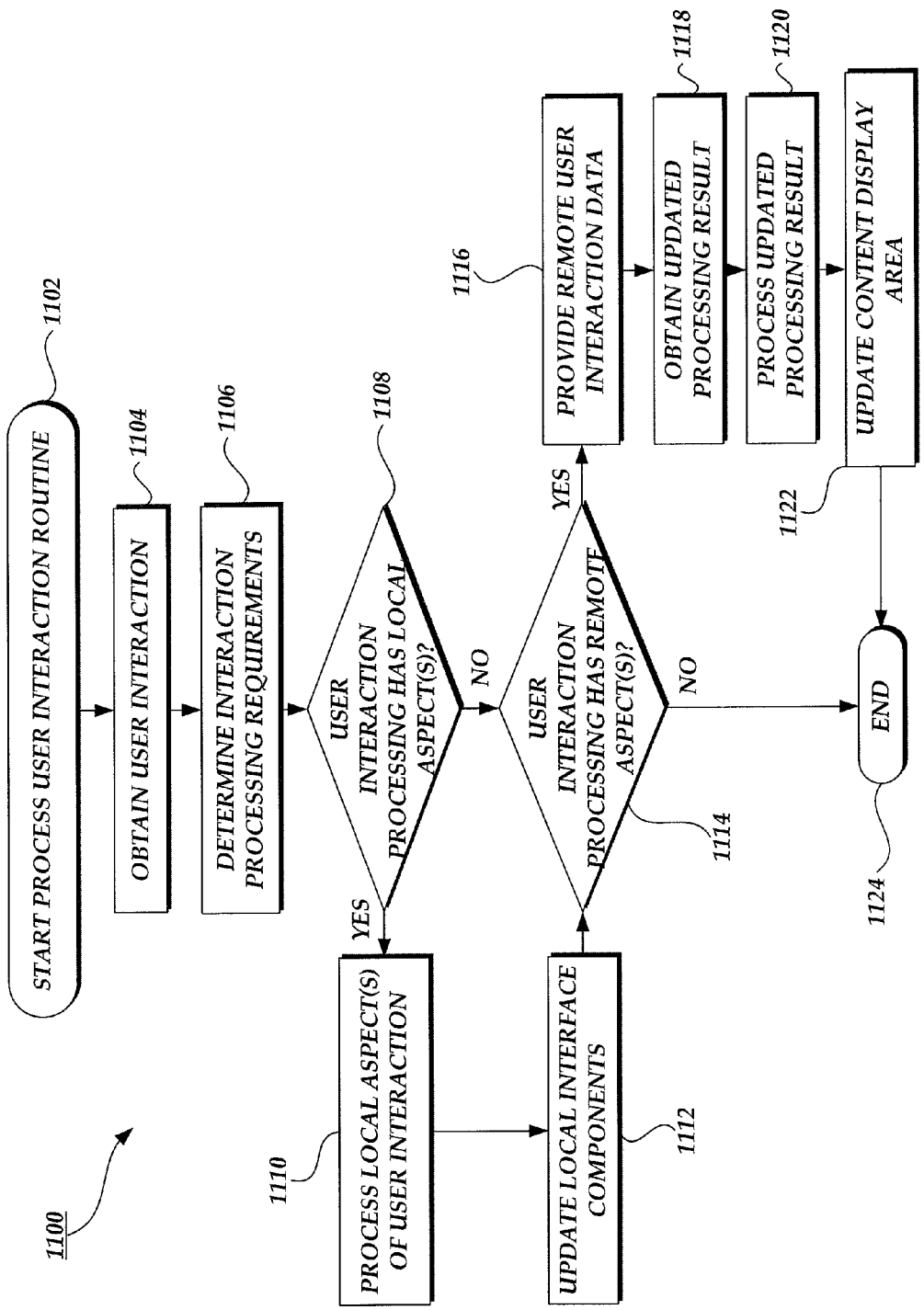
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7A. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7A and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7A and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
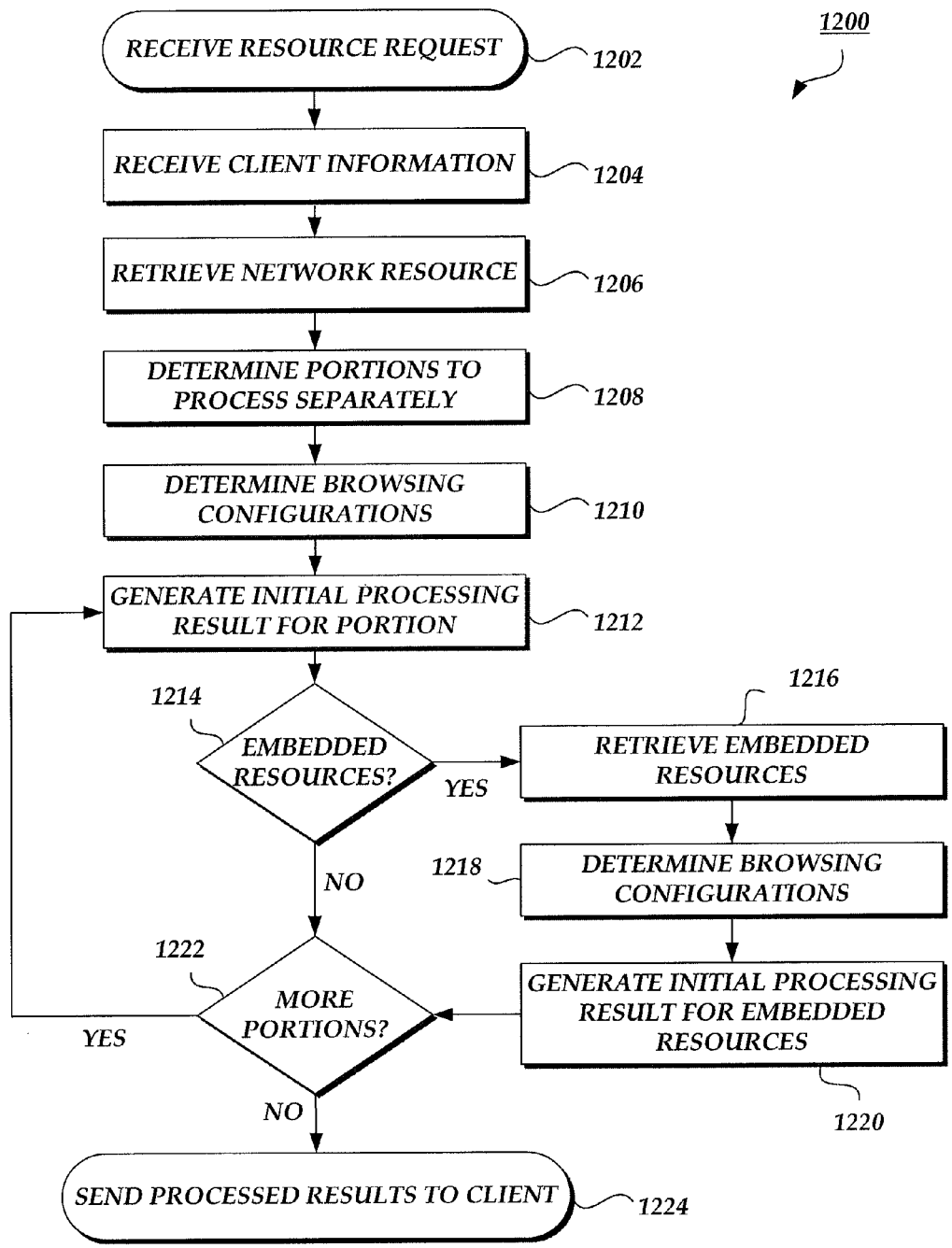
FIG. 12 is a flow diagram illustrative of a browsing configuration determination routine implemented by a network computing provider.

FIG. 12 illustrates an example routine 1200 implemented by a network computing provider 107 for processing network resources according to multiple browsing configurations. Some network resources can have portions which require varying degrees of processing. For example, some network resources, such as web sites, may have several different portions of content to be displayed on a client computing device 102 at the same time, including separate frame or div portions, or portions of textual content, videos, images, applets, animations, or input controls. Some portions require little processing, while other can require intense computational processing. The textual content can be transmitted to the client computing device 102, and processed and displayed at the client computing device 102 without a large consumption of resources, such as bandwidth, CPU processing, etc. In contrast, the video content may require considerable bandwidth to deliver to the client computing device 102, and considerable CPU processing once received by the client computing device 102 in order to display the video content. Using two different browsing configurations, one for the textual content and one for the video content, the textual content can be delivered to the client computing device 102 largely unprocessed, while the network computing provider 107 can take over the processing of the video content. Such a separation of the processing can be desirable when the network computing provider 107 has considerable resources available, such as CPU capacity, memory, a high-bandwidth connection with the content provider 104, etc. The processing of the video content by the network computing provider 107 can be based on the bandwidth and hardware profile of the client computing device 102, and the network computing provider 107 can stream a pre-processed display of the video to the client computing device 102 in a resolution that is appropriate for the bandwidth and hardware profile of the client computing device 102. In some embodiments, the resolution of the video can be substantially reduced due to the limited screen size of the client computing device, etc. This can result in a performance improvement when compared to the delivery of the raw video for processing on the client computing device 102.

The routine 1200 begins at block 1202, where the network computing provider 107 receives a request from a client computing device 102 for a network resource. The request can be a new request in an existing browsing session, the first request of a new browsing session, etc. The network computing provider 107 can be configured to execute the routine 1200 in response to request. The routine 1200 then proceeds to block 1204.

At block 1204, the network computing provider 107 receives information about the client computing device 102 making the request. The information can include hardware profile information, such as screen size, CPU type, memory buffer size, etc. The information can also include a profile of the current network connection that the client computing device 102 has access to, including the speed, distance from the network computing provider 107, etc. In some embodiments, the information can be received with the resource request received in block, 1202. In some embodiments, the information can be received in a separate transmission. In some embodiments, the information can be retrieved from data store that maintains a profile of the client computing device 102. The routine 1200 then proceeds to block 1206.

At block 1206, the network computing provider 107 can retrieve the network resource requested by the client computing device 102. For example, the network computing provider 107 can retrieve a web site from a content provider 104, and the retrieved content can be in the form of a file, such as an HTML file. The routine 1200 then proceeds to block 1208.

At block 1208, the network computing provider 107 can determine which portions of the network resource to process separately. For example, if the network resource is a web site, and the content retrieved is an HTML file, the network computing provider can analyze the HTML file and determine that separate processing should occur for each frame of the HTML file. In some embodiments, the network computing provider 107 can determine that the HTML file should be separated into different portions based on criteria other than frames. For example, some HTML files embed computation-intensive resources, such as video and games, inline without the use of frames. In such cases, the network computing provider 107 can separate these computation-intensive portions of the web site from other less computation-intensive resources, such as the textual portions of the web site. In some embodiments, the network resource itself may include information about which portions to process separately. The routine 1200 can then proceed to block 1210.

At block 1210, the network computing provider 107 can determine the individual browsing configurations for the multiple portions determined in block 1208. The determination of the individual browsing configurations can proceed as described in detail above. In one example, the textual portion of a web site can be assigned a browsing configuration wherein a substantial amount of the processing occurs within the browsing application on the client computing device 102. The video portion of the web site can be assigned a different browsing configuration, wherein the video is processed and rendered with an appropriate codec on the network computing provider, and a remote desktop connection display is prepared and will be streamed to the client computing device 102 and displayed there within a frame inserted into the web site for that purpose. Video playback controls can be included on the client computing device 102, so that any user interaction with the controls will not experience the network latency that a normal remote desktop connect may experience.

In some embodiments, the determination can be based in whole or in part on prior experience with the network resource and/or content provider 104. For example, if the network computing provider 107 has processed the requested network resource before, or one similar to the requested network resource, or another network resource from the same content provider 104, the network computing provider 107 can utilize historical processing information to assist in the determination of browsing configurations. In some embodiments, the network resource may include information about the browsing configuration for each portion. For example, a web site may specify that video processing and rendering should occur on the network computing provider 107, and rendered video display should be sent to a buffer on the client computing device 102, etc.

In some embodiments, the processing actions to be performed at the network computing provider 104 can include filtering one or more components from the network resource. The filtered component, which can be a component of a portion of the network resource or an entire portion of the network resource, is not executed or processed further by either the network computing provider 104 or the client computing device 102, but rather is discarded or otherwise disregarded. For example, if a network resource, such as a web page, includes executable code, such as Javascript, that does not assist in rendering the web page but rather executes other non-essential functions and may have a detrimental effect on the overall user experience, the network computing provider can discard that component and pass the remainder of the network resource to the client computing device 102. In some embodiments, the filtering can occur at the client computing device 102.

At block 1212, the network computing provider 107 can begin to generate initial processing results. In one embodiment, the network computing provider 107 generates the initial processing results portion-by-portion. In some embodiments, the network computing provider 107 can generate the initial processing results for some or all portions in parallel, for example in a multi-processor computing devices or by distributing the processing over multiple computing devices. The processing of block 1212 can involve, for example, rendering video content, video game environments, re-sizing images, etc.

In one illustrative example, one portion of a web site includes a video game, and that portion can be assigned a different browsing configuration than the rest of the web site. If the rest of the web site is largely static, most of the processing can be performed on the client computing device 102. The portion which includes the video game can have a different distribution of processing, with the network computing provider 107 taking much more of the processing load. The user controls, which can require a high degree of responsiveness, can be assigned to the client computing device 102. The computation-heavy portion of the video game, such as graphics processing, can be taken on by the network computing provider 107. To reduce latency between the processing of user controls on the client computing device 102 and changes to the display, which is largely processed on the network computing device 107, predictive algorithms can be used by the network computing device 107 to determine which portion of the gaming environment to process and send to a buffer on the client computing device 102. For example, if a user is moving in a northward direction through a 3D gaming environment, the network computing provider 107 can process and render the graphical environment that the user will encounter if the user continues northward. The processed content can be transmitted to a buffer on the client computing device 102, and the client computing device 102 can retrieve the buffered content in a display-ready format when it is needed, thereby avoiding any delay which may occur due to processing the graphical content.

Many web sites have resources embedded within them, and the embedded resources can also be assigned separate browsing configurations. At decision block 1214, the network computing provider 107 can determine whether there are any embedded resources to process. If there are, the routine 1200 can proceed to block 1216. Otherwise, execution of the routine can proceed to decision block 1222.

At block 1216, the network computing provider 107 can retrieve any resources to be embedded in requested network resource. For example, dynamic content can be embedded in a web site, and can require retrieval from the same content provider 104 or a different content provider 104. In response to retrieving the embedded resources, execution of the routine 1200 can proceed to block 1218.

At block 1218, the network computing provider 107 can determine a browsing configuration for the embedded resources retrieved in block 1216. In some embodiments, the browsing configurations for the embedded resources can be determined in a manner similar to the determination of browsing configurations in block 1210 and with respect to previous figures. For example, if certain processing activities associated with an embedded resource require a considerable amount of computational resources, those activities can be performed on the network computing provider 107, while other activities can be performed on the client computing device 102. The routine 1200 can then proceed to block 1220.

At block 1220, the network computing provider 107 can generate initial processing results for the embedded resources retrieved in block 1216. The initial processing results can be generated by performing, on the network computing device 107, the processing actions assigned to the network computing device 107 in the browsing configurations determined in block 1218. The rest of the processing actions, assigned to the client computing device in the browsing configurations determined in block 1218, can be skipped or ignored by the network computing provider 107. The routine 1200 can then proceed to decision block 1222.

At decision block 1222, the network computing provider 107 can determine whether there are more portions of the network resource, retrieved in block 1206, to process. For example, a network resource may be separated into frames, with each frame being assigned a different browsing configuration in block 1210. The routine 1200 iterates through each of these portions, returning to block 1212 to generate an initial processing result according to the browsing configuration for the portion, and proceeding to decision block 1214 to determine if there are embedded resources to retrieve and process as described above. When there are no more portions of the network resource to process, the routine proceeds to block 1224, where execution terminates.

Figure 13:
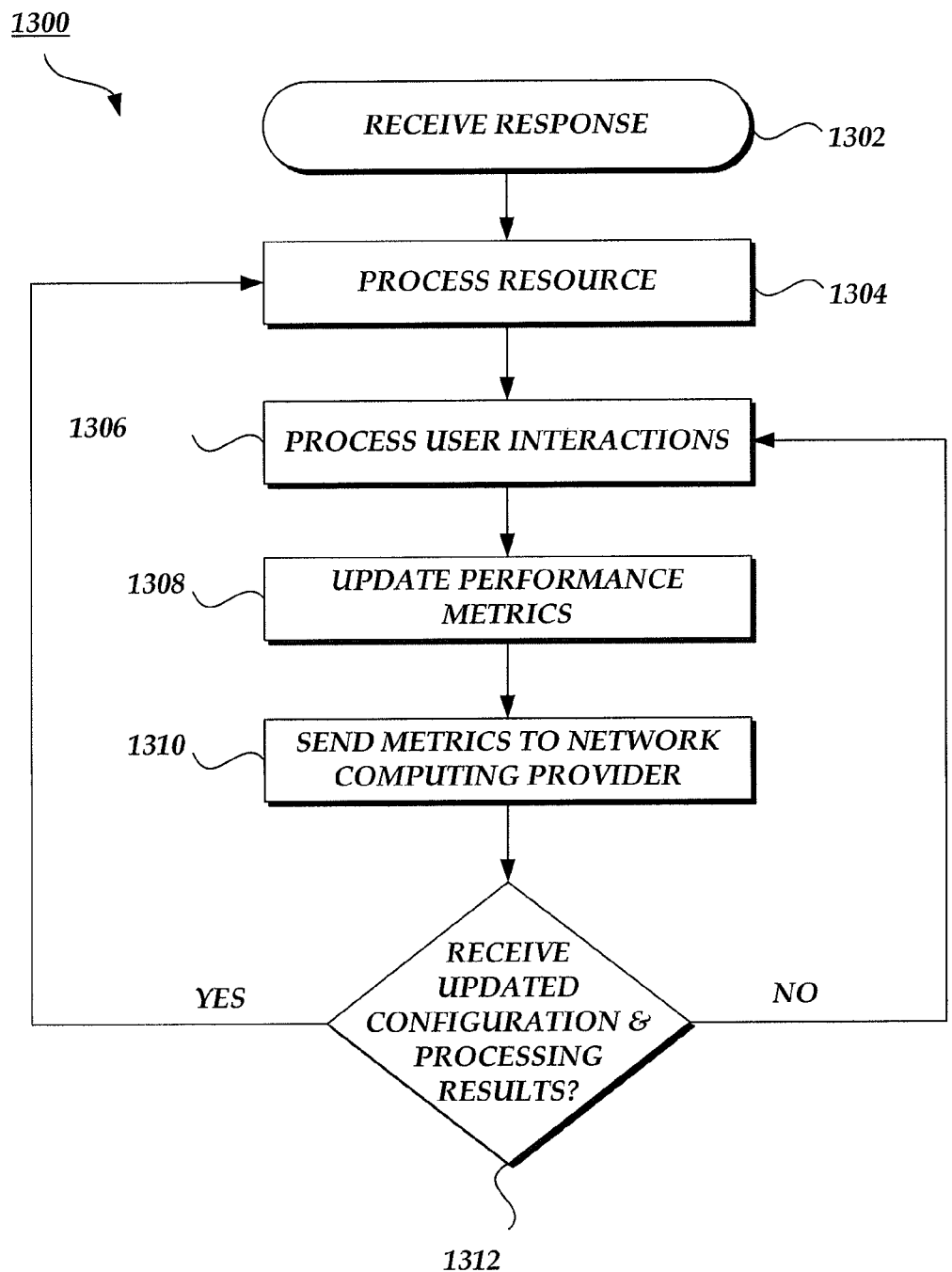
FIG. 13 is a flow diagram illustrative of a routine for processing a network resource according to multiple browsing configurations, implemented by a client computing device.

FIG. 13 illustrates an example routine 1300 implemented by a client computing device 102 for receiving and processing a network resource with multiple browsing configurations. For example, the routine 1300 can be executed on the client computing device 102 to process resources received from a network computing provider 107, which has retrieved and processed the network resource according to routine 1200. In addition, a client computing device 102 can utilize the routine 1300 to create metrics related to the processing and performance of the network resources on the client computing device 102, and can send those metrics to the network computing provider 107. The network computing provider 107 can utilize the metrics to adjust the browsing configurations that it has determined for the different portions of the network resource, and can send updated processing results to the client computing device. For example, if there is unexpected latency between the client computing device 102 and the network computing provider 107, a remote desktop connection between the two for display of a pre-rendered video may not be appropriate, and instead the raw video can be sent directly to the client computing device 102 for processing and display there. In another example, the network bandwidth of the client computing device 102 may have improved substantially in the time since information about the client's bandwidth was sent to the network computing provider 107. In such a case, it may be beneficial to the client computing device 102 to shift most of the processing of a video game or other computationally intensive portion of a network resource to the network computing device 107, and then establish a remote desktop connection between the two devices, with the network computing provider 107 transmitting a display of the game, and the client computing device 102 replacing the portion of the web site with a frame that can receive the display from the network computing provider 107.

The routine 1300 begins at block 1302, where the client computing device 102 receives a response from the network computing provider 107. The response can be received in response to a request for a network resource, such as a webs site, sent from the client computing device 102 to the network computing provider 107. The response can include multiple initial processing results, created by the network computing provider 107 during execution of routine 1200 as described above. For example, the client computing device 102 may have requested a web site that hosts an online, multi-player video game. The network computing provider 107 may have determined two different browsing configurations for the web site, separating the portion of the web site that displays the graphical elements of the web site from the rest of the web site, which may contain static text and images, or may contain other interactive or computationally intensive portions, etc. The response received by the client computing device 102 in block 1302 may comprise information about the different browsing configurations, including information about which processing activities are to be performed on the client computing device 102. The response may also include a partial or complete pre-rendering of the graphical elements of the video game, along with substantially unprocessed textual elements for the other portion of the web site. The routine 1300 can then proceed to block 1304.

At block 1304, the client computing device 102 can perform processing actions, indicated by the browsing configurations received in block 1302, on the portions of the network resource, embedded resources, and other assets received in response to its request. For example, the static textual elements of the web site may be received in an unprocessed HTML file, and the browsing application on the client computing device 102 can process the HTML file for display. The portion of the web site which displays the graphical elements of the video game may have been replaced by a frame, and the client computing device 102 may establish a remote desktop connection with the network computing provider 107 in order stream the remote desktop display of the graphical elements to the client computing device 102. The processing of the user controls of the video game—whether the controls are graphical buttons on the web site, or the keyboard, mouse, and/or other hardware controllers—can be handled by the client computing device 102 and transmitted to the network computing provider 107 for processing with the graphical elements, if the browsing configuration determined by the network computing provider 107 specifies such a processing slit. In some browsing configurations, the display of graphical elements of the video game on the client computing device 102 may not be a remote desktop display, but rather a pre-rendered display processed by the network computing provider 107. As described above, the network computing provider 107 can process the graphical elements of the video game prior to the time the client computing device 102 needs to display them, by using predictions based on, for example, the direction that the user of the client computing device 102 is moving through a 3D gaming environment, etc. The network computing provider 107 can pre-render the next area that a user will see if the user continues on the current heading, and the pre-rendering can be buffered on the client computing device 102.

At block 1306, the client computing device 102 can process user interactions with the network resource, such as video game controls, video playback controls, distributed application tasks, and the like. For example, if the network resource is a web site hosting an online image editing application, the user interactions can include mouse movements and keyboard input to process an image, etc. If one or more of the browsing configurations specify that the network computing provider 107 is to receive the user interactions and update the image displayed on the client computing device 102, the user interactions can be transmitted to the network computing provider 107 and updated display data can be received by the client computing device 102. The routine 1300 can then proceed to block 1308.

At block 1308, the client computing device 102 can create or update metrics related to the performance of the client computing device 102 while processing the network resource, while processing user interactions with the network resource, etc. For example, the metrics can include CPU utilization, available memory buffer, network bandwidth, etc. Execution of the routine 1300 can then proceed to block 1310.

At block 1310, the client computing device 102 can send the updated metrics to the network computing provider 107. The network computing provider 107 may use the metrics during the processing of the portions of the network resource that, according to the browsing configurations, occur on the network computing provider 107. Additionally, the network computing provider 107 may use the metrics to adjust the browsing configurations, taking on more of the processing load or assigning more of the processing load to the client computing device 102, as the circumstances may indicate. For example, the metrics received by the network computing provider 107 may indicate that the time it takes to perform certain processing actions on the client computing device 102 is longer than would otherwise be expected based on the hardware configuration received by the network computing device 107 when it initially determined the browsing configuration. In such cases, the browsing configuration can be modified and more processing can occur on the network computing provider 107. The network computing provider 107 can perform the additional processing, and send the newly processed portion of the network resource, along with the updated browsing configuration, to the client computing device 102. The routine 1300 can then proceed to decision block 1312.

At decision block 1312, the client computing device 102 can determine whether it has received one or more updated browsing configurations or processed portions of the network resource from the network computing provider 107. If the client computing device 102 has received such updates, the routine 1300 can return to block 1304 for processing of the newly received portions of the network resource according to the updated browsing configurations. Otherwise, execution of the routine 1300 can return to block 1306, where user interactions can be processed during the life of the network resource on the client computing device 102. When the network resource is no longer active on the client computing device, for example when the browsing application is closed, the routine 1300 can terminate execution.

Figure 14:
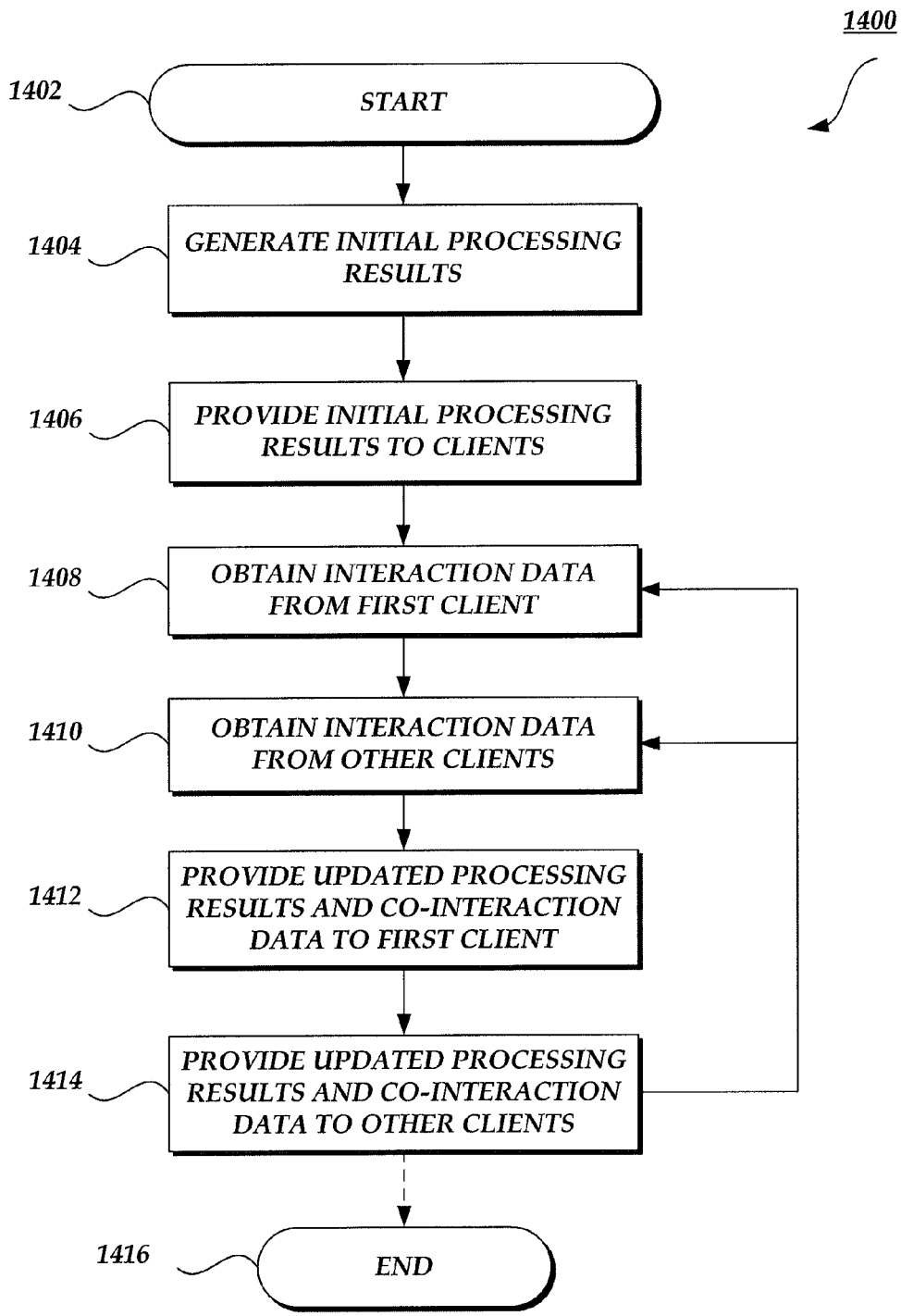
FIG. 14 is a flow diagram illustrative of a routine for processing a co-browsing routine according to multiple browsing configurations, implemented by a network computing provider.

FIG. 14 illustrates an example routine 1400 for processing of a co-browsing session, as implemented by a network computing provider 107. A specific component of the network computing provider 107 illustrated in FIG. 1 may execute the routine 1400. For example, an instance of a browsing application on an NCC POP 142 may be configured to execute all or part of the routine 1400. The description of the routine 1400 below illustratively uses the network computing provider 107 as the computing device which executes the routine 1400, but the description is not meant to be limiting and it will be appreciated than other computing devices or components may execution the routine 1400.

The routine 1400 begins at block 1402. A client computing device 102 may initialize a co-browsing session by requesting a network resource. One or more additional client computing devices may also participate in the co-browsing session, receiving resources from the network computing device 102 and interacting with the resources in a way that can affect the display or execution of the resource on the other client computing devices 102 in the co-browsing session. For example, the network computing provider 107 may receive various identifying information, including, but not limited to, device information, software browser information, location information, a user ID or other user information, a co-browsing session identifier, etc. from one or more of the client computing devices 102 in the co-browsing session. The network computing provider 107 may determine multiple browsing configurations, corresponding to the various portions of the requested network resource and the various client computing devices 102. In one embodiment, the network computing provider 107 can determine, for a single portion of the network resource, a different browsing configuration for each client computing device 102.

In one embodiment, the network computing provider 107 may maintain one or more persistent browse sessions associated with one or more client computing devices 102. The persistent browse sessions can remain active even when no client computing device 102 is actively connected to the session. For example, the persistent browse session can remain in memory of the network computing provider 107 for lengthy processing of a network resource, such as a video editing operation, while a client computing device 102 is disconnected. The same client computing device 102 and/or one or more different client computing devices 102 can reconnect to the persistent browsing session at a later time and perform additional operations on the network resource. Illustratively, each persistent browse session may be associated with a different piece of content, browser tab, window, frame, etc. of a browser running at a client computing device 102 as described in FIGS. 9-13 above, and each piece of content may have a different browsing configuration associated with it. In one embodiment, each persistent browse session may be associated with any number of same or different browsing configurations. In a further embodiment, the network computing provider 107 may select a new browsing configuration for the persistent browse session each time a client computing device 102 accesses the persistent browsing session. For example, if a client computing device 102 with limited processing power accesses an existing persistent browsing session, the network computing provider 107 may determine one or more browsing configurations that allow a majority of processing to be performed at the network computing provider 107, even though the persistent browsing session was originally configured with different browsing configurations. As discussed above, browsing configurations may be the same or different for each client computing device 102 associated with a co-browsing and/or persistent browsing session At block 1404, the network computing provider 107 can generate initial processing results, and at block 1406 the network computing provider 107 can provide the initial processing results to the one or more client computing devices 102 currently connected to the co-browsing session. In some embodiments, the initial processing results can be generated separately for each client computing device 102 because each client computing device 102 can be associated with a different browsing configuration. For example, a client computing device 102 with a slow network connection and ample local computational resources may be assigned a browsing configuration for a portion of a network resource, such as a video file, which specifies that most processing should occur on the client computing device 102 so as to reduce latency. A second client computing device 102 may have a browsing configuration for the same portion of the network resource—the same video—which specifies that most processing should occur at the network computing provider 107, because the second client computing device 102 has a fast network connection and fewer local computational resources.

In another example, a number of different client computing devices 102 with different display capabilities may access a persistent browsing context. In one embodiment, the network computing provider 107 may process content associated with a persistent co-browsing session specifically for display on the client computing device 102 currently accessing the persistent co-browsing session. A first client computing device 102A may create a new persistent co-browsing session with a network computing provider 107. For the purposes of this specific example, the first client computing device 102A may be a personal computer with a large screen, keyboard, and mouse. A user at the first client computing device 102 may request and receive a web site from the network computing provider 107. Illustratively, the web site loaded at the first client computing device 102A may be displayed as formatted for a large screen browse window. At a later point in time, a second client computing device 102B may access the persistent co-browsing session. Illustratively, the second client computing device 102B may be a smart phone or other device with limited screen size and input capabilities. In one embodiment, the network computing provider 107 may determine a browsing configuration to provide processing results to the second client computing device 102B in which the content associated with the persistent co-browsing session is formatted for a small screen.

In yet another example, the persistent browsing context may be established by the network computing provider 104. For example, a network computing provider 104 may manage access to a web page with a live streaming video of an event, and the stream can be accessed by any number of client computing devices 102, each with different hardware and different processing capabilities. The network computing provider 102 can determine browsing configurations for the streaming portion—or any other portion—of the web page dynamically, when it is accessed by a client computing device 104, or the network computing provider 102 may predetermine a number of browsing configurations to select from.

At block 1408, the network computing provider 107 can obtain interaction data from the first client computing device 102. For example, the interaction data can be a mouse click on a pause button associated with a video. The routine 1400 can then proceed to block 1410.

At block 1410, the network computing provider 107 can obtain interaction data from the one or more other client computing devices 102 associated with the co-browsing session.

At block 1412, the network computing provider 107 may process any content and/or user interaction data and provide processing results and co-interaction data to the client computing device 102.

At block 1412, the network computing provider 107 may process any content and/or user interaction data and provide processing results and co-interaction data to the other client computing devices 102 associated with the co-browsing session. For example, the video can be paused on all devices in response to the pause command issued by the first client computing device 102.

The network computing provider 107 may continue to exchange user interaction data, processing results, and co-interaction data with the client computing devices 102 until, at block 1416, the routine 1400 ends. In one embodiment, a user may break a connection with the co-browsing session by closing a browser or powering off the client computing device 102. In some embodiments, the network computing provider 107 may place a persistent co-browsing session in a passive state when no active interaction between the client computing device 102 and the persistent browsing session is occurring. Illustratively, placing a persistent browsing session in a passive state may include, but is not limited to, closing a software browser application running on the network computing provider 107 that is associated with the persistent browsing session, copying, moving, or storing data associated with various content, content states, or browser states associated with the persistent browsing session, etc. The network computing provider 107 may place a persistent browsing session in a passive state based on any number of factors, including, but not limited to, a time-out of interaction data from the client computing device or devices 102, user options or preferences, an attribute of the content (e.g., size, embedded resources, content type, content category), flags or tags associated with the content, or preferences associated with a network computing provider 107, client computing device 102, browser or application, operating system, CDN 106, content provider 104, or other entity or system.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is to be understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for remote session browsing comprising:

as implemented by a network computing component comprising one or more computing devices configured to execute specific instructions, obtaining, from a network resource provider, a network resource responsive to a network resource request from a client-side browser application executing on a client computing device separate from the network computing component, wherein the network resource comprises a first portion with dynamic content and a second portion with static content;

determining, based at least partly on computing resources required to process the first portion with dynamic content at the client computing device, to generate a view of the first portion with dynamic content rendered using a network-based browser executed by the network computing component;

determining that the second portion with static content is to be processed at the client computing device;

determining, using the network-based browser, a first browsing configuration corresponding to the first portion with dynamic content and a second browsing configuration corresponding to the second portion with static content, wherein the first and the second browsing configurations identify at least a first set of processing actions to be performed at a network computing component, and a second set of processing actions to be performed at the client computing device, wherein the first browsing configuration is based at least in part on the determination to generate the view of the first portion with dynamic content using the network-based browser application, wherein the second browsing configuration is based at least in part on the determination that the second portion with static content is to be processed at the client computing device, and wherein the first and the second browsing configurations are different;

generating, using the network-based browser, an initial processing result according to each of the determined browsing configurations for transmission to the client computing device, wherein the initial processing result comprises the view of the first portion with dynamic content rendered by the network-based browser, the view embedded within the second portion with static content, wherein at least part of the second portion with static content is unmodified by the network computing component; and providing the initial processing result to the client computing device, the client computing device configured to cause the display of the network resource.

2. The computer-implemented method of claim 1, further comprising obtaining a browse session request from the client computing device, wherein the browse session request corresponds to the network resource with the first portion with dynamic content and the second portion with static content.

3. The computer-implemented method of claim 1, wherein the view of the first portion with dynamic content is delivered to the client computing device in connection with at least one of a frame, div, applet, or input control.

4. The computer-implemented method of claim 1 further comprising:

processing the network resource to obtain one or more embedded resource identifiers corresponding to one or more embedded resources associated with the network resource; and obtaining the one or more embedded resources from one or more content providers based on the one or more embedded resource identifiers.

5. The computer-implemented method of claim 4, wherein determining the first browsing configuration and the second browsing configuration comprises determining the first browsing configuration for a first embedded resource of the first portion with dynamic content, and the second browsing configuration for a second embedded resource of the second portion with static content.

6. The computer-implemented method of claim 1, further comprising obtaining the network resource responsive to a browse session request made during a persistent browse session.

7. The computer-implemented method of claim 1, wherein the first browsing configurations identifies a processing action corresponding to processing a video on the network computing component to stream a remote desktop representation of the video to the client computing device.

8. The computer-implemented method of claim 7, wherein the network computing component comprises a library of video codecs and processes the video such that the client computing device does not require the codec utilized by the network computing component to process the video.

9. The computer-implemented method of claim 1, wherein the first browsing configurations identifies a processing action corresponding to processing a video game on the network computing component in response to determining the most likely accessed area of the video game.

10. The computer-implemented method of claim 1, wherein at least one of the first and the second browsing configurations comprises filtering a component of the network resource.

11. The computer-implemented method of claim 1, wherein the first browsing configurations identifies a processing action corresponding to processing a video editing application on the network computing component.

12. The computer-implemented method of claim 1, wherein identifying a first set of processing actions to perform on the network computing component comprises determining which actions require an amount of computing resources above a threshold.

13. The computer-implemented method of claim 1, wherein the computing resources comprise at least one of CPU utilization, memory availability, or network bandwidth.

14. The computer-implemented method of claim 13, further comprising:

receiving, from the client computing device, information about computing resources available to the client computing device; and providing the initial processing result to the client computing device, the client computing device configured to cause the display of the network resource.

15. The computer-implemented method of claim 1, wherein the second portion with static content comprises text or an image.

16. A computer-implemented method for remote session browsing comprising:

as implemented by a network computing component comprising one or more computing devices configured to execute specific instructions, obtaining a network resource responsive to a network resource request from a client-side browser application executing on a first client computing device separate from the network computing component, wherein the network resource comprises a first portion with dynamic content and a second portion with static content;

determining, based at least partly on computing resources required to process the first portion with dynamic content at a plurality of client computing devices, to generate a view of the first portion with dynamic content using a network-based browser executed by the network computing component;

determining that the second portion with static content is to be processed at the plurality of client computing devices;

determining, using the network-based browser, a first browsing configuration associated with the first portion with dynamic content and a second browsing configuration associated with the second portion with static content respectively, wherein the first and the second browsing configurations identify at least a first set of processing actions to be performed at a network computing component, and a second set of processing actions to be performed at the plurality of client computing devices comprising the first client computing device, wherein the first browsing configuration is based at least in part on the determination to generate the view of the first portion with dynamic content using the network-based browser, wherein the second browsing configuration is based at least in part on the determination that the second portion with static content is to be processed at the plurality of client computing devices, and wherein the first and the second browsing configurations are different;

generating, using the network-based browser, an initial processing result according to each of the determined browsing configurations for transmission to the plurality of client computing devices, wherein the initial processing result comprises the view of the first portion with dynamic content rendered by the network-based browser, the view embedded within the second portion with static content of the network resource, wherein at least part of the second portion with static content is unmodified by the network computing component;

providing the initial processing result to the plurality of client computing devices for display, wherein the plurality of client computing devices have joined a co-browsing session;

obtaining first interaction data from the first client computing device; and providing one or more updated processing results to the plurality of client computing devices, wherein the updated processing results are based at least in part on the first interaction data.

17. The computer-implemented method of claim 16, wherein the network resource is processed in response to a request made during a persistent browse session.

18. The computer-implemented method of claim 16, wherein identifying a first set of processing actions to perform on the network computing component comprises determining which actions require an amount of computing resources above a threshold.

19. The computer-implemented method of claim 16, wherein the computing resources comprise at least one of CPU utilization, memory availability, or network bandwidth.

20. The computer-implemented method of claim 16, wherein the network computing component receives, from at least one of the plurality of client computing devices, information about computing resources available to the at least one of the plurality of computing devices.

21. The computer-implemented method of claim 16, wherein the network computing component comprises a library of video codecs and processes the video such that the plurality of computing devices do not require the codec utilized by the network computing component to process the video.

22. The computer-implemented method of claim 16, wherein the first browsing configuration identifies a processing action corresponding to processing a video game on the network computing component in response to determining the most likely accessed area of the video game.

23. The computer-implemented method of claim 16, wherein the first browsing configuration comprises processing an application on the network computing component.

24. The computer-implemented method of claim 16 further comprising:

processing the first portion with dynamic content by performing, using the network based browser, the first set of processing actions of the first browsing configuration to generate the view of the first portion with dynamic content.

25. The computer-implemented method of claim 16, wherein the second portion with static content comprises text or an image.

26. A system for remote session browsing comprising:

one or more computer processors;

at least one computer memory accessible by at least one of the one or more computer processors; and a network computing component comprising a network-based browser application executed by the one or more computer processors, wherein the network computing component is configured to at least:

obtain, using the network-based browser application, a web page responsive to a web page request from a client-side browser application executing on a client computing device separate from the network computing component, wherein the web page comprises a first portion with dynamic video content and a second portion with static textual content;

determine, based at least partly on computing resources required to process the first portion with the dynamic video content at the client computing device, to generate a view of the first portion with dynamic video content rendered using the network-based browser application;

determine that the second portion with the static textual content is to be processed at the client computing device;

determine, using the network-based browser application, a first browsing configuration corresponding to the first portion with the dynamic content and a second browsing configuration corresponding to the second portion with the static textual content, wherein the first and second browsing configurations identify at least a first set of processing actions to be performed at the network computing component, and a second set of processing actions to be performed at a client computing device, wherein the first browsing configuration is based at least in part on the determination to generate, using the network-based browser application, the view of the first portion with the dynamic video content, wherein the second browsing configuration is based at least in part on the determination that the second portion with the static textual content is to be processed at the client computing device, and wherein the first browsing configuration is different than the second browsing configuration; and generate, using the network-based browser application, an initial processing result according to the first browsing configuration and second browsing configuration for transmission to the client computing device, wherein the initial processing result comprises the view of the first portion of the web page with the dynamic video content rendered by the network-based browser application, the view embedded within the second portion of the web page with the static textual content, wherein at least part of the second portion of the web page with the static textual content is unmodified by the network computing component.

27. The system of claim 26, wherein the dynamic video content is a video, video game, or application.

28. The system of claim 26, wherein the view of the first portion with dynamic video content is embedded within a frame of the second portion of the web page with the static textual content.

29. The system of claim 26, wherein the network computing component is further configured to receive, from the client computing device, client configuration information, wherein the client configuration information comprises at least one of a screen size, a CPU type, or a network connection type.

30. The system of claim 26, wherein the network computing component is further configured to receive feedback information from the client computing device, wherein the feedback information comprises at least one operating parameter of the client computing device, and wherein the network computing component alters at least one of the first browsing configuration or the second browsing confirmation based on the feedback information.

31. The system of claim 26, wherein the network computing component is further configured to at least:
receive a request from the client computing device regarding a persistent browsing session and;
generate, using the network-based browser application, the persistent browsing session in which the web site can be accessed at a later time or from a second client computing device without being retrieved again from the content source.

32. The system of claim 26, wherein the network computing component is further configured to at least:
process the first portion with the dynamic video content by performing, using the network-based browser application, the first set of processing actions of the first browsing configuration to generate the view of the first portion with dynamic video content.

* * * * *